Feb. 13, 1940.        W. C. BEAMES        2,190,182
BRUSH CONSTRUCTION
Filed May 6, 1938
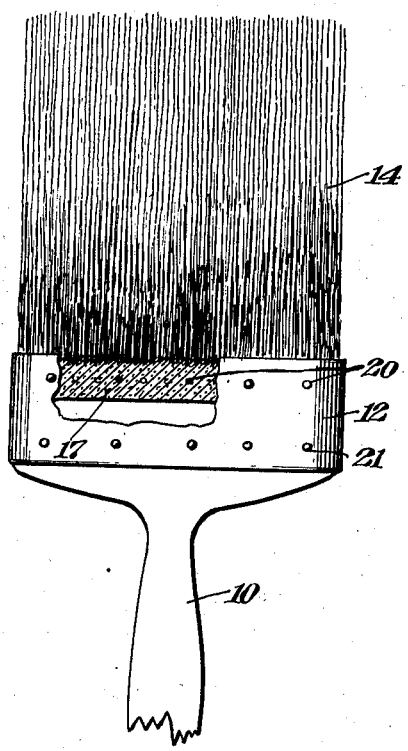
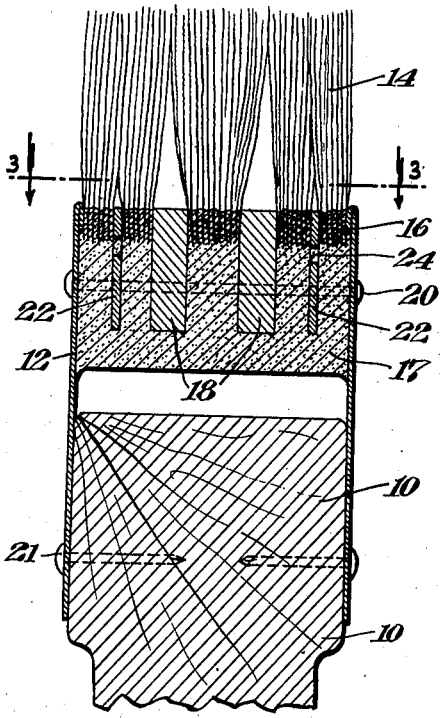
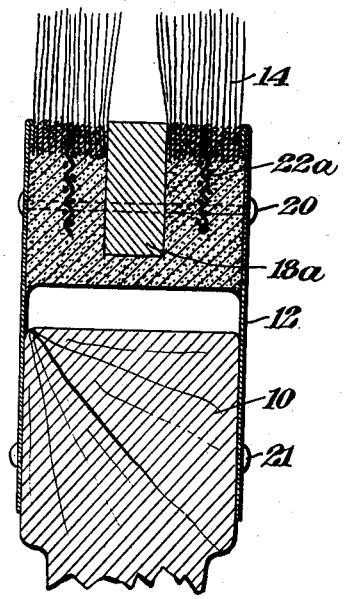
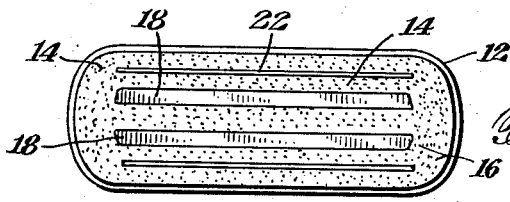
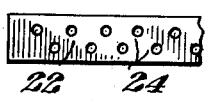
INVENTOR
Walden C. Beames
BY Alan U. Mann
ATTORNEY Patented Feb. 13, 1940

2,190,182

UNITED STATES PATENT OFFICE 2,190,182

BRUSH CONSTRUCTION

Walden C. Beames, River Edge, N. J., assignor to Devoe & Raynolds Co., Inc., a corporation of New York Application May 6, 1938, Serial No. 206,349

3 Claims. (Cl. 15—193)

My invention has to do with an improved construction of brush.

Splitting and cracking of the bonding composition in which the bristles of a brush are anchored is a long standing evil in the brush making art.

I have discovered that by utilizing strips of material having relatively high tensile strength and by building up an integrated brush structure I can materially overcome splitting and cracking of the bonding composition.

Broadly speaking, my invention consists of the introduction of strips of a substance having a relatively high tensile strength in the bonding composition in which the butt ends of the bristles are anchored; and securing a substantial bond between these strips and the bonding composition proper; and structurally binding these strips to the ferrule of the brush.

I find that I get particularly valuable results by using thin rectangular metal strips and having these strips run lengthwise in the bonding composition within the ferrule. Sheet steel or iron (preferably nickel plated) make excellent strips; but I also get good results by using wood fiber or laminated cotton fiber impregnated with a waterproofing composition. To form a bond between the strips and the bonding composition proper I mill the faces of the strips and perforate the strips with a series of holes. The strips are inserted in the bonding composition while it is still soft and upon hardening the strips are firmly bonded in the composition. The strips are placed vertically in the brush. Ordinarily, I prefer to have one edge of the strips adjacent the point where the bristles emerge from the bonding composition. In that case, the strips will tend to divide the bristles into layers. This division of the bristles into layers is very limited and is not at all comparable to the division which is a function of the plug of a brush. The strips should be sufficiently deep so that the strips can run parallel to the shanks of the butt ends of the bristles within the bonding composition and project beyond the ends of the bristles into the bonding composition.

In my construction of brush the bonding composition is built up to a substantial depth beyond the ends of the bristles. By virtue of this arrangement, the bonding composition serves two functions. The layer in which the bristles are set is a setting composition; and the layer which underlies the setting composition acts as a filler composition. The strips within the ferrule form a bond with both the setting composition and the filler composition; and the filler composition acts to bond the ends of the bristles at the base of the setting composition.

Strictly speaking, the distinction between the setting composition and the filler composition is purely functional; the same bonding composition often being used for both functions. However, in the better type brush one type of bonding composition is used for the setting and another for the filler. In the actual process of manufacture, the filler composition is applied after the bristles are set in the setting composition so that there may be physical line of demarcation between the setting composition and the filler composition.

In accordance with my invention, two or three metal strips will ordinarily be held in the bonding composition. Because these strips project well into the filler composition clinched nails or rivets driven through the ferrule from one side of the brush to the other will penetrate these strips to bind the brush assembly together as an integral structure. By virtue of this arrangement the strips are hung on the rivet or clinched nail and the strips and the bonding composition proper become a part of the integrated brush assembly.

I find that a brush constructed in accordance with my invention provides an improved setting and makes possible a shallower setting for the bristles; and that there is increased anchorage of the bristles within the ferrule. In accordance with my invention, the tensile strength of the strips is utilized to prevent cracking or splitting of the composition proper; and the hanging of the strips on rivets penetrating the entire brush assembly gives a unitary brush structure having interlocked parts.

In the drawing I show a specific application of my invention to a brush.

Fig. 1 shows a front view of a brush with a portion of the ferrule broken away;

Fig. 2 is an enlarged vertical section;

Fig. 3 is a section taken on the line 3—3 of Fig. 2;

Figs. 4, 5, and 6 show a number of different types of strips; Fig. 4 being a metal strip with milled faces and having a series of perforations;

Fig. 5, a corrugated strip, and

Fig. 6, a mesh screen;

Fig. 7 is a section similar to Fig. 2 showing the use of mesh screens in the brush construction and showing a brush having but one central plug.

The numeral 10 indicates the handle of the brush and 12 the ferrule. Rivets 20 are driven from one side of the ferrule through to the other side to bind the brush assembly together. Nails 21 are driven from opposite sides of the ferrule through the ferrule and into the handle to fasten the ferrule to the handle. The butt ends of bristles 14 are anchored in a bonding composition 16. That portion of the bonding composition in which the butt ends of the bristles are set consists of a setting composition. Underlying the setting composition is a filler composition 17. Plugs 18 are set in the bonding composition and serve to separate the bristles to form a plurality of bristle layers.

In the drawing I show thin rectangular metal strips running lengthwise in the bonding composition. One edge of the strip is approximately on line with the upper limits of the bonding composition 16 adjacent the entrance of bristles into the composition; and the other edge extends well into the bonding composition so that it is pierced by rivets 20 driven through the brush assembly from one side of the ferrule to the other. I find that particularly valuable results obtain when the strips are arranged in this manner.

The strips may assume a number of different forms. Three kinds are shown. In Fig. 4 the strip 22 has milled faces and a series of perforations 24; in Fig. 5 the strip 22b is corrugated; and in Fig. 6 the strip 22a consists of a mesh screen. For strength, durability, and bonding quality, I prefer a thin rectangular metal strip (as in Fig. 4) having milled faces and a series of perforations. Ordinarily, I prefer to use two of these strips in the bonding composition.

I claim:

1. A brush comprising a handle, a ferrule, and bristles, a recess in the brush formed by the inner walls of the ferrule and the base of the handle, a filling composition adapted to be poured into said recess and adapted to receive bristles mounted at their basal ends in said bonding composition when the composition is soft and upon hardening of said composition the bristles are retained therein, a narrow longitudinal strip of a substance of relatively high tensile strength set longitudinally in said bonding composition, said strip being formed with a plurality of transverse perforations and being locked in the bonding composition by having the bonding composition penetrate the aforesaid perforations when soft and upon hardening locking the strip in the bonding composition, means for holding the bonding composition and the strip within the ferrule as a unitary structure, said means contacting only the ferrule, the bonding composition, and the strip but not contacting the bristles.

2. A structure as specified in claim 1 in which the narrow longitudinal strip of a substance of relatively high tensile strength has at least three faces exposed to the bonding composition, the other face being exposed exteriorally adjacent the outer level of the bonding composition.

3. A structure as specified in claim 1 in which the means for holding the bonding composition and strip within the ferrule as a unitary structure comprises a clinched nail extending transversely through the brush from one side to the other and passing through the bonding composition and strip above the level of the basal ends of the bristles set in the bonding comopsition.

WALDEN C. BEAMES.